No. 758,843. PATENTED MAY 3, 1904.
A. KOPPEL.
WAGON OR LIKE COUPLING.
APPLICATION FILED NOV. 17, 1903.
NO MODEL.
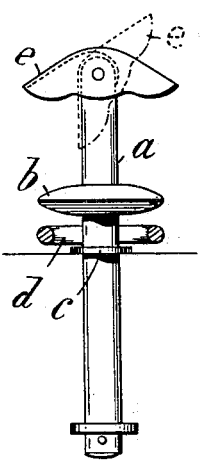
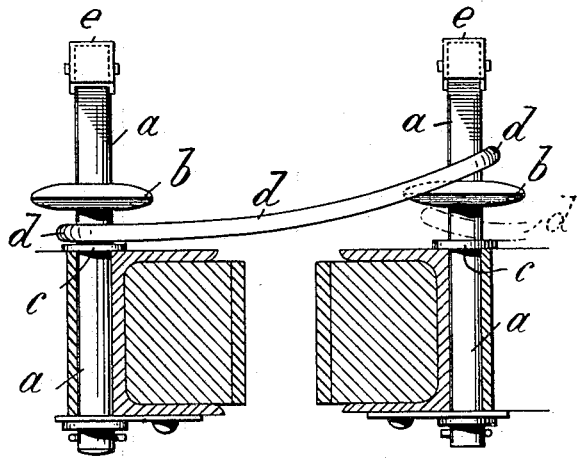

No. 758,843.  
Patented May 3, 1904.

UNITED STATES PATENT OFFICE.

ARTHUR KOPPEL, OF BERLIN, GERMANY.

WAGON OR LIKE COUPLING.

SPECIFICATION forming part of Letters Patent No. 758,843, dated May 3, 1904.

Application filed November 17, 1903. Serial No. 181,551. (No model.)

*To all whom it may concern:*

Be it known that I, ARTHUR KOPPEL, manufacturer, of 38 to 40 Neue Friedrichstrasse, Berlin, C., Germany, have invented certain new and useful Improvements in and Connected with Wagon or Like Couplings, of which the following is a full, clear, and exact specification.

The object of the present invention is to improve the well-known shackle-coupling for tilting wagons and the like, especially in the direction of easy and simple handling, without decreasing the security or certainty thereof.

The essence of the invention in contrast to older devices, in which the bolts must be turned in their longitudinally-slotted shackles for coupling and uncoupling, consists in this, that the bolt-head carries one or more pivoted pieces transverse to the longitudinal axis of the wagon, which pieces when turned up or tilted permit coupling or uncoupling of the shackle, but when reversed prevent the shackle from unintentionally springing off.

In the accompanying drawings the invention is represented, by way of example, according to one modification.

Figure 1 is a view of a complete coupling on two wagon-underframes. Fig. 2 is a view of half of a coupling.

The underframe of each wagon is equipped in the usual manner with a bolt $a$, standing perpendicularly thereto, which so carries the longitudinally-slotted shackle $d$ underneath a lens-shaped disk $b$ and over a collar $c$ that the shackle has sufficient free movement and can not only be swiveled, but can also be raised into an oblique position. The head of the bolt carries an anchor-like pivoted locking-piece $e$, which is adapted to normally assume a horizontal position transversely to the longitudinal axis of the wagon and prevents the sliding off or springing off of the shackle, but when in the upright or tilted position (shown by dotted lines) permits of the shackle passing or sliding over. The piece $e$ is adapted to return automatically into its horizontal position by making the limb lying to the right in Fig. 2 full and that lying to the left hollow, so that the former possesses an excess in weight. The movement of the head $e$ into the approximately horizontal position can be determined or limited by a lug on the bolt which engages the full limb, or the latter itself may be adapted to engage the bolt.

The fixed bolt $a$ may be applied to the underframe of the wagon in various ways. It is evident that the locking-piece $e$ may also be shaped or arranged in any suitable manner. For example, it may be made of two parts closable toward different sides, and it may be secured in the locking position in other manner than by gravity.

Having thus described my invention, what I claim as new, and desire to secure by Letters Patent, is—

1. A shackle-coupling comprising shackles movable on vertical rigid bolts under lens-like disks while each bolt-head is equipped with pivoted locking-pieces transverse to the longitudinal axis of the wagon which in normal position prevent the unintentional springing off of the shackles.

2. A shackle-coupling comprising shackles movable on vertical rigid bolts under lens-like disks while each bolt-head is equipped with cross-pieces pivoted to the heads of the bolts at right angles to the longitudinal axis of the car, one arm of which is loaded relatively to the other and normally bears against the bolt, so maintaining the cross-pieces in horizontal position, substantially as described.

In witness whereof I have hereunto set my hand in presence of two witnesses.

ARTHUR KOPPEL.

Witnesses:
HENRY HASPER,
WOLDEMAR HAUPT.